United States Patent
Martin et al.

(10) Patent No.: US 10,303,653 B2
(45) Date of Patent: May 28, 2019

(54) AUTOMATIC COMPUTER USER ACCOUNT MANAGEMENT ON MULTI ACCOUNT COMPUTER SYSTEM

(71) Applicant: Microsoft Technology Licensing, LLC, Redmond, WA (US)

(72) Inventors: Jessica Lynn Martin, Ann Arbor, MI (US); Yaou Wei, Redmond, WA (US); Zachary Grant Herman, Seattle, WA (US); Tyler Joseph Donahue, Bellevue, WA (US); Christopher Ronald Anthony, Bellevue, WA (US); Christophe Dae Seung Lejeune, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 15/267,029

(22) Filed: Sep. 15, 2016

(65) Prior Publication Data
US 2017/0310785 A1    Oct. 26, 2017

Related U.S. Application Data

(60) Provisional application No. 62/326,394, filed on Apr. 22, 2016.

(51) Int. Cl.
*G06F 3/06* (2006.01)
*G06F 16/17* (2019.01)
(Continued)

(52) U.S. Cl.
CPC ........ *G06F 16/1727* (2019.01); *G06F 3/0652* (2013.01); *G06F 21/6245* (2013.01);
(Continued)

(58) Field of Classification Search
CPC ............ G06F 21/6263; G06F 16/1727; G06F 3/0652; G06F 21/6245; G06F 2221/2143;
(Continued)

(56) References Cited

U.S. PATENT DOCUMENTS

| 6,144,959 A | 11/2000 | Anderson et al. |
| 8,572,709 B2 | 10/2013 | Hockings et al. |

(Continued)

FOREIGN PATENT DOCUMENTS

| CN | 104021629 A | 9/2014 |
| EP | 1643342 A1 | 4/2006 |
| JP | 2011198094 A | 10/2011 |

OTHER PUBLICATIONS

Microsoft, " Microsoft Identity Lifecycle Manager "2" ", 2008, https://web.archive.org/web/20090220074528/http://download.microsoft.com:80/download/D/B/8/DB894282-9C2F-4501-9584-2B4CB6DF5B67/ILM2%20datasheet%20final.pdf, (Year: 2008).*

(Continued)

*Primary Examiner* — Gregory G Todd
(74) *Attorney, Agent, or Firm* — Workman Nydegger

(57) ABSTRACT

Managing user accounts on a shared computing device to maintain at least one of system resources or performance. The method includes identifying one or more desired triggers indicating that that one or more user accounts should be deleted from the shared computing device to comply with a predetermined resource target. The method further includes, as a result of the one or more triggers, deleting user accounts to attempt to comply with the predetermined resource target.

20 Claims, 3 Drawing Sheets

(51) Int. Cl.
*G06F 21/62* (2013.01)
*H04L 29/08* (2006.01)

(52) U.S. Cl.
CPC .... *H04L 29/08819* (2013.01); *H04L 67/2852* (2013.01); *H04L 67/306* (2013.01); *G06F 2221/2143* (2013.01); *H04L 67/143* (2013.01)

(58) Field of Classification Search
CPC ............... H04L 67/306; H04L 67/2852; H04L 29/08819
See application file for complete search history.

(56) References Cited

U.S. PATENT DOCUMENTS

| | | |
|---|---|---|
| 8,881,249 B2 | 11/2014 | Nunn et al. |
| 8,938,810 B2 | 1/2015 | Richardson et al. |
| 8,984,589 B2 | 3/2015 | Liu |
| 9,268,782 B2 | 2/2016 | Hackborn et al. |
| 9,754,091 B2* | 9/2017 | Kode ...................... G06F 21/31 |
| 2006/0015930 A1* | 1/2006 | Shoham ............... H04L 63/0823 726/6 |
| 2010/0318745 A1* | 12/2010 | Wheeler ................ G06F 12/126 711/136 |
| 2012/0017094 A1* | 1/2012 | Tulchinsky ......... G06F 21/6263 713/182 |
| 2013/0047247 A1* | 2/2013 | Matsuda ................ G06F 21/335 726/9 |
| 2013/0160141 A1 | 6/2013 | Tseng et al. |
| 2015/0019368 A1* | 1/2015 | Matteucci .......... G06Q 30/0621 705/26.5 |
| 2015/0067819 A1* | 3/2015 | Shribman |
| 2015/0142974 A1 | 5/2015 | Bernaudin et al. |
| 2015/0339464 A1 | 11/2015 | Kode et al. |
| 2016/0041879 A1* | 2/2016 | Varadarajan ........ G06F 11/1412 707/653 |
| 2016/0260188 A1* | 9/2016 | Harouche .......... G06Q 50/2057 |
| 2017/0105087 A1* | 4/2017 | Gonzalez .............. H04W 4/003 |
| 2017/0116429 A1* | 4/2017 | Tessman ............. G06F 21/6209 |
| 2017/0289333 A1* | 10/2017 | Pai .................... H04M 1/72519 |

OTHER PUBLICATIONS

Chris Peters, Apr. 28, 2010, Securing Public Access Computers: Some Alternatives to Windows SteadyState, http://www.techsoupforlibraries.org/blog/securing-public-access-computers-some-alternatives-to-windows-steadystate (Year: 2010).*

Windows SteadyState, Dec. 27, 2009, https://web.archive.org/web/20091227080227/http://www.microsoft.com/windows/products/winfamily/sharedaccess/default.mspx (Year: 2009).*

SailPoint IdentityIQ Administration Guide, Version 6.3, https://raiiqxp.rockwellautomation.com/identityiq/doc/pdf/6_3_IdentityIQ_Administration_Guide.pdf (Year: 2014).*

"Automated Active Directory User Account Management", Published on: Mar. 8, 2013 Available at: https://www.manageengine.com/products/ad-manager/active-directory-management-automation/automated-active-directory-user-account-management.html.

"GPO Windows 7—Automatically Delete Local User Profiles Older Than X Number of Days", Retrieved From<< http://www.edugeek.net/forums/windows-7/69653-gpo-windows-7-automatically-delete-local-user-profiles-older-than-x-number-days.html>>, Feb. 8, 2011, 8 Pages.

"Article: Manage & Purge Local Windows User Profiles", Retrieved From << http:/ www.itninja.com/blog/view/manage-purge-local-windows-user-profiles>, Aug. 18, 2011, 6 Pages.

Klein, Helge, "Delprof2—User Profile Deletion Tool—Helge Klein", Retrieved From <<https://helgeklein.com/free-tools/delprof2-user-profile-deletion-tool/>>, May 2, 2011, 6 Pages.

"International Search Report and Written Opinion Issued in PCT Application No. PCT/US2017/027849", dated Sep. 7, 2017, 13 Pages.

* cited by examiner

300

302 Identify One Or More Triggers Indicating That That One Or More User Accounts Should Be Deleted From The Shared Computing Device To Comply With A Predetermined Resource Target

304 As A Result Of The One Or More Triggers, Delete User Accounts To Attempt To Comply With The Predetermined Resource Target

*Figure 3*

AUTOMATIC COMPUTER USER ACCOUNT MANAGEMENT ON MULTI ACCOUNT COMPUTER SYSTEM

CROSS-REFERENCE TO RELATED APPLICATIONS

This application claims the benefit of and priority to U.S. Provisional Patent Application Ser. No. 62/326,394 filed on Apr. 22, 2016 and entitled "Automatic Account Management," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

On shared computing devices used by many people, there are at least two fundamental problems. 1) Security/privacy of a person's data (passwords, browsing history, etc.) and 2) resilience of the device over time as many users access it as it relates to disk space, performance, and reliability. In particular, the shared device may not be able to store and maintain all user information.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computer implemented method of managing user accounts on a shared computing device to maintain at least one of system resources or performance. The method includes identifying one or more triggers indicating that that one or more user accounts should be deleted from the shared computing device to comply with a predetermined resource target. The method further includes, as a result of the one or more triggers, deleting user accounts to attempt to comply with the predetermined resource target.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates a computer implemented method of managing user accounts on a shared computing device.

DETAILED DESCRIPTION

Embodiments described herein can implement automatic account management for multiple accounts on a device, where the account management 1) automatically creates new accounts for users which require authentication by the user to access and 2) automatically delete accounts according to some predetermined desired resource capacity target criteria so that there are always resources for another person to use a shared computing device. Thus, embodiments can automatically create, cache, and delete accounts (containers of user state/data) based on security/privacy or device limitations (e.g., disk space or number of allowed users).

Embodiments may include functionality for deleting user accounts (where a user account is a container of user data/state) automatically without any user input. Embodiments may include a set of rules/settings that specify when account deletion should be done. Embodiments may include a set of rules/setting that specify how device resources (e.g. disk space) are allowed to be used for caching accounts. Embodiments may be implemented where account deletion occurs in some instances when the device is in use, and in other instances when the device is idle or not in use according to some predetermined idleness metric. Embodiments may include functionality for creating new accounts for users when they use the device. Some embodiments may be implemented where when the device is "locked" to a user. Some of these embodiments enable the next user to bypass the lock and use the device. Some embodiments may implement special controls for accounts which have administrative rights to the device. Some embodiments may include functionality that allows administrators to specify how the shared computing device is configured with respect to different account types.

Details are now illustrated. Note that in the illustrated examples below, reference may be made specifically to products available from Microsoft Corporation of Redmond Wash. However, it should be appreciated that other embodiments may be implemented using other technologies and suppliers.

Automatic account management optimizes an operating system to be used in shared usage scenarios such as shared carts in education, touchdown spaces in enterprise, temporary use PCs in retail, etc.

Figure 1:
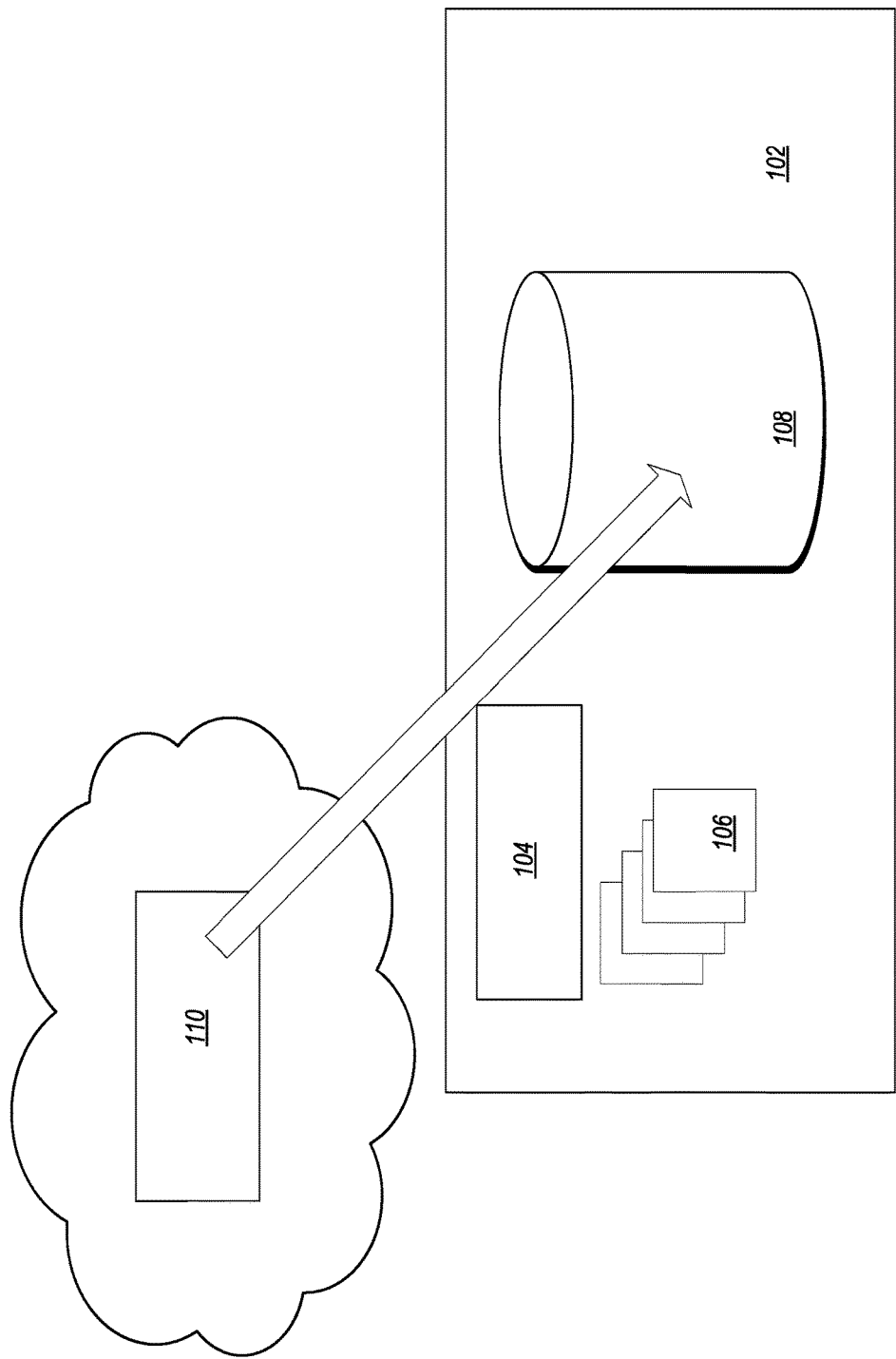
FIG. 1 illustrates a shared computing device including user accounts, where the shared computing device is connected to a cloud service.

Referring now to FIG. 1, when a computing device 102 is in a shared computing device configuration, an account manager service 104 will automatically cache and delete one or more of the accounts 106 on the shared computing device 102. Deletion of accounts can be configured to happen at various times. For example, in some embodiments, every account (or some group of accounts) existing on a shared computing device 102 may be deleted when a user signs out of the shared computing device 102. Alternatively, embodiments may begin to delete various user accounts when it is determined that disk space for a disk 108 on the shared computing device 102 is running low. In yet another alternative embodiment, embodiments may begin to delete various user accounts when it is determined that a number of target user accounts on a shared computing system has been reached. In particular, embodiments may delete accounts based on use of a certain amount of a limited resource. Thus, for example, the computing device 102 may only allow a limited number of accounts. Or the system may have a limited amount of storage.

Various factors may be evaluated when determining when to begin deleting user accounts on a shared computing system and/or how to delete user accounts on a shared computing system. For example, such factors may include one or more of disk space on the device; synchronization status of user's settings and data; power state management; shared device usage patterns, etc.

Note that in some embodiments, some local accounts are not cached at the shared computing device 102, but rather; they are always deleted immediately when signed out. This may be determined based on an account mode.

The account model specifies how the shared computing device 102 can be used. The account model may have various selectable options.

The account model may include an only guest selection. When this selection is made for the shared computing device 102, anyone can walk up to the shared computing device 102 and use it as a standard (non-admin) user. When the account is signed out, the account is deleted immediately.

In an alternative embodiment, the account model may include a domain-joined only selection. When this selection is made for the shared computing device 102, only users with an account to one or more given domains can sign in to the shared computing device 102. When the account is signed out, it will be cached at the shared computing device 102 or deleted according to how the account management settings are configured.

In an alternative embodiment, the account model may include domain-joined and guest selection. When this selection is made for the shared computing device 102, both domain-joined accounts and a guest accounts are available to use the shared computing device 102.

A deletion policy specifies when accounts should be cached or deleted. For example, the deletion policy may specify that all or certain accounts should be deleted immediately after a user logs off of the shared computing device 102. In this case, when the deletion policy is implemented, any created account will be deleted immediately (or as soon as practicable) after sign off.

Alternatively, the deletion policy may specify that accounts are deleted at some disk space threshold. In this case, the deletion policy is implemented by causing accounts to be cached until free disk space reaches a configurable delete threshold. After reaching this threshold, accounts will be deleted until free disk space reaches a configuration cache threshold. Various different policies can be used to determine the order in which accounts are deleted. For example, in some embodiments accounts are deleted in order of oldest accessed to most recently accessed. However, alternative configurations and deletion decisions will be illustrated in more detail below.

Some embodiments may include disk level numbers which specify bounds for the account manager to delete accounts in the background. For example, a caching number defines the upper bound of free disk space for when the account manager will cease deleting accounts. A deletion number defines a lower bound of free disk space for when the account manager will start deleting accounts during maintenance (e.g., idle) periods. During periods when the shared computing device 102 is in use, in some embodiments, the threshold will be automatically lowered slightly so that account deletion does not impact the user actively using the shared computing device 102.

The following illustrates an example. In this example, the caching number is 50 and the deletion number is 25. Accounts will be cached while the free disk space is above 25%. When the free disk space is less than 25% (the deletion number) at a maintenance period, accounts will be deleted (in some embodiments, this may be done by deleting accounts in an order according to when they were last used, beginning with accounts that have not been used for the longest period of time) until the free disk space is above 50% (i.e., the caching number). Accounts will be deleted immediately at sign off of an account if free space is under the deletion threshold and disk space is very low, regardless of if the shared computing device 102 is actively in use or not.

Figure 2:
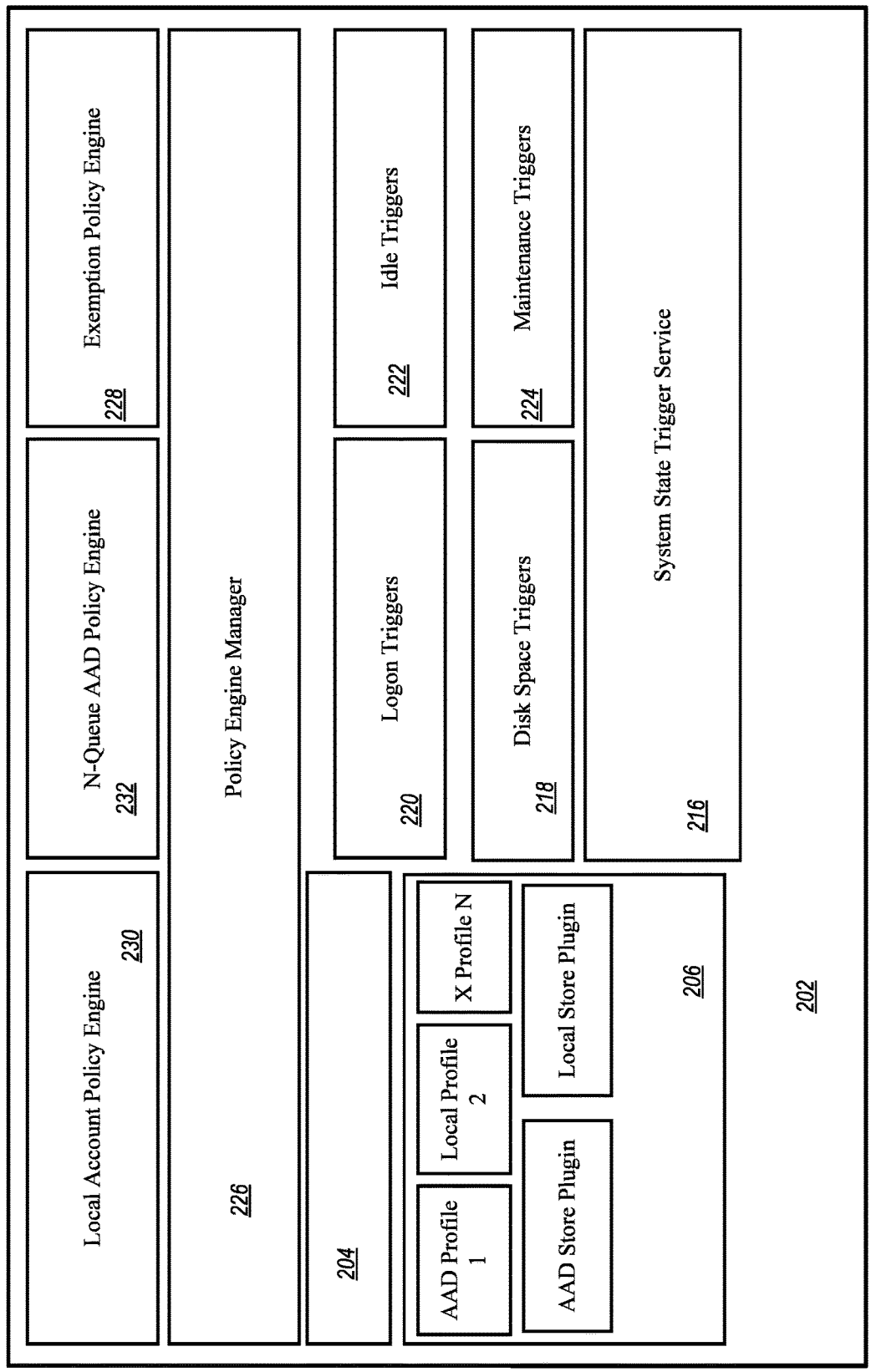
FIG. 2 illustrates a shared pc account manager service.

The following illustrates details with respect to the internal structure of the Shared PC account manager service. FIG. 2 illustrates an example of the shared PC account manager service.

At a high level, the shared PC account manager service 202 is broken down into various components as illustrated in FIG. 2.

A user account store 204 is a component that is one of the lower level components of the shared PC account manager service 202 that maintains a list of the accounts that are being managed along with the metadata that each policy engine needs to store to make their decision over each particular account.

The user profile store 206 has a list of objects, which provides the ability to: 1) Enumerate the list of accounts and 2) delete the account/user combination (in some embodiments, just deleting the account, in other embodiments such as local accounts, the account and User). Internally the user profile store 206 will use User Manager APIs (described later herein) to indicate to the triggers when to delegate to the right API to add the information to the user profile store 206.

The user profile object is one of the most basic elements that is operated on. It represents the state that is on the system that, when deleted, will force that same user to go back through an account creation and/or retrieval process. The shared PC account manager service's job is to balance the presence of these user accounts to ensure that login for repeat users can be fast, while making sure that this caching of account data does not contribute to excessive disk usage. User accounts have some fundamental properties that the rest of the shared PC account manager service 202 will use to reason over (note that these will all be available from the object to query, though some will be used for specific policy engines). The following illustrates some example properties.

Basic Properties
Account security identifier (SID)
User SID
Type (e.g., domain vs. local)
Local Specific Properties
Fresh (Has been used, or is cached to improve login performance)
N-Queue Specific Properties
Last Logoff Time
Evaluation Properties Should Delete—Unevaluated/Yes/No A system state trigger system may be used in some embodiments to abstract out the different "triggers" in the system that would cause policy engines to be activated. It also provides a way to easily individually unit test the various components (i.e. embodiments can test that the disk space triggers work correctly by simulating the underlying disk usage APIs). There are logically different triggers that can be listened to. Embodiments may include a component that takes care of abstracting out the detection of these triggers and their associated state.

The system state trigger service 216 is conceptually a "hub" for the rest of the actual triggers—it creates them, maintains a list of trigger components and allows other components to query for specific triggers to:

1) Register/Unregister for specific triggers.
2) Ask for the other state associated with each trigger (e.g., in some embodiments, one can ask the disk space trigger service 218 for information about the current disk space, as this information is important in enforcing policy). This component also plays a slightly larger role during the policy engine evaluation phase discussed below.

Note that each trigger can have multiple states, such as for example, logged in/logged off, idle/not idle, critical disk space/low/ok, etc.

The logon triggers service 220 is the trigger service that notifies when a logoff OR logon has occurred. The act of a user logoff firing, for example, can cause a policy evaluation to occur, during which the Nth account that was used last can be deleted.

The disk space triggers service 218 is the component that abstracts out the listening of disk space events (i.e. below a certain threshold, which a policy engine can build upon). An alternative to the disk space triggers is a periodic thread timer which wakes up and makes a call.

The idle triggers service 222 is designed to identify that the system is currently idle. This information can be used, for example, to log out someone once a certain threshold has passed.

The maintenance hour triggers service 224 fires its trigger when the system enters time that would be considered maintenance hours.

Some embodiments may be configured to wake the system from sleep by setting special wake timers. Embodiments can use this wake mechanism to augment certain triggers (e.g., maintenance hours trigger) so that embodiments can actually wake the machine up if possible to do nightly account cleanup.

Other triggers, although not shown, may be implemented additionally or alternatively. For example, in some embodiments, a date trigger may be implemented. In this example, if the account has not been used in X days, where X is a predetermined number, it will be deleted. This is useful in some retention rule scenarios (e.g., a rule which states 'things older that X days must be deleted') and public devices (e.g., use of a hotel kiosk, as the hotel kiosk may become compromised). Although not illustrated here, other triggers may be used alternatively or additionally in embodiments of the invention.

Policy Engines

The policy engines is a collection of individual policy engines that together enforce desired policies. In the illustrated example there are three policy engines shown. However, it should be appreciated, that in other embodiments different policy engines or mechanisms may be used to accomplish a desired functionality. Police engine activity can be coordinated by the policy engine manager 226.

The exemption policy engine 228 is configured to ensure that for select users, their account is not deleted. This engine 228 may be configured to reason over accounts of both networked domain and local types. The list of exemptions may be persistent across reboots and crashes. This can be accomplished by storing information in operating-system-level storage such as the registry in Windows® based systems available from Microsoft Corporation of Redmond, Wash., or various configuration files such as those used in various Unix based systems. Embodiments may store an ID that is unique to each account (Account SID) to ensure that the account information stays in the storage. To avoid listening to specific operating-system-level storage changes, embodiments can build a list of exemptions in memory by using Logoff events to know when to refresh the performance Account SID state. This is particularly effective way of updating state, because the account won't be deleted while a user is logged in, so as the user logs off, embodiments can safely see if there is now an exemption (or now no longer an exemption) and update the state accordingly. Any time the exemption policy engine 228 encounters such an account, it will mark the account as "should not delete"— this means at the end of a policy evaluation cycle, this will not be deleted even if it was used infrequently (or was otherwise highly ranked by some other policy engine). Also note that in some embodiments this exemption policy engine 228 will run first, so that anything exempted does not result in wasting cycles doing reevaluations later.

The local account policy engine 230 powers the local account or "guest" scenario. This local account policy engine 230 listens to logon triggers to know when users have logged off—it then enumerates the local accounts and marks all of them as candidates for deletion. Generally, this local account policy engine 220 will only reason over accounts of the local type.

The N-Queue Policy AAD Engine 232 is the policy engine that manages the list of networked domain accounts that are on the system and ensures that only the most recent N accounts are actually preserved on the system. In some embodiments, it also uses primarily the logon triggers 220 to know when to do its work (it can also use the maintenance triggers 224.) This policy engine will only reason over accounts that have the networked domain type. This N-Queue policy AAD Engine 232 combines the fact that there is a login trigger with the "last logoff time" to create a sorted list of networked domain accounts that it wants to delete. It will delete all but N accounts. In some embodiments, the N accounts may be determined by determining the most recently used. Alternatively, embodiments may select one or more accounts to be in the N accounts based on other characteristics such as specialized user role treatment, exemption treatment, or different rules for determining the N accounts. Alternatively, exempt accounts can be excluded from N. For example, if there are 6 accounts on the shared device, and the three of the last used happen to be exempt, and the value for N is 3, this policy engine will do nothing— it has ensured that the three most recent things are there, and the later ones are exempt specifically by admins.

The following illustrates details with respect to a policy evaluation algorithm. Details are illustrated here that describe the way that policy evaluation and eventual account deletion occurs. The algorithm is as follows:

1) Trigger Occurs
   For example, this could involve a logoff that just happened, and now the system is at the lock screen.
2) Profile Store Updates Updates to the account state happen first, to ensure that things like the logoff time are accurate.

3) Notification to Policy Engines

The policy engine manager 226 itself will fan out the particular trigger notification to all of the policy engines. In the illustrated example, this means that, in order, the exemption policy engine 22 will receive a notification, followed by the local account policy engine 230, followed by the N-Queue AAD policy engine 232.

4) Per-Engine Evaluation and State Modification

If an engine determines that a particular trigger is relevant, it will enumerate the accounts that are relevant, and now it will evaluate if an account should be deleted or preserved. If an engine determines that an account should be deleted, it will mark an account-level evaluation property (this is one of the basic properties) as "should delete", or some similar marking. If not, it can leave it unchanged (or, if it wants to prevent it from being deleted, mark it as "should not delete" or some similar marking).

5) Reconciliation of the Evaluation Property and Deletion

Now that all of the policy engines have had an opportunity to execute (note that this means that all policy engines will evaluate a single trigger and attempt to perform various actions based on the trigger—this ensures that race conditions do not occur where one engine is responding async to a trigger while another is also responding to the trigger at the same time) embodiments walk through accounts and look for anything now marked as "should delete" and communication is sent to the user profile store 206 service to delete that account. The user profile store 206 will then delete to the appropriate subcomponent (i.e. local/networked domain) to ensure the appropriate state is cleaned up This algorithm implies that the individual engines do not need to cause the deletion themselves—they just tell another component about their desire, and the other component ensure that the right thing happens.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Referring now to FIG. 3, a method 300 is illustrated. The method 300 may be practiced in a computing environment. The method 300 includes acts for managing a user accounts on a shared computing device to maintain system performance. For example, embodiments may include functionality for managing accounts 106 on the computing device 102 illustrated in FIG. 1.

The method 300 includes identifying one or more triggers indicating that that one or more user accounts should be deleted from the shared computing device to comply with a predetermined resource target (act 302).

The method 300 further includes, as a result of the one or more resource based triggers, as a result of the one or more triggers, deleting user accounts to attempt to comply with the predetermined resource target (act 304). For example the account manager service 104 illustrated in FIG. 1 may be used to delete one or more of the accounts 106 stored at the computing device 102 when a trigger occurs indicating that the certain amount of disk space has been used or for other reasons as will be illustrated in more detail below.

The method 300 may be practiced where the one or more triggers comprise resource triggers based on disk usage. For example, a trigger may be generated when the disk 108 reaches the predetermined amount of used disk space. In alternative embodiments, triggers may be based on processor usage, network usage, RAM usage, or some other system resource usage.

The method 300 may be practiced where the one or more triggers comprise resource based triggers based on queue size. In particular, the queue size is a target number of user accounts to be on the computing device 102. For example, embodiments may determine that a preferred queue size is six users. If the number of accounts on the computing device 102 exceed some threshold, such as 200% of the preferred queue size, then the account manager service 104 will begin the leading accounts on the computing device 102 until the target queue size is reached.

The method 300 may be practiced where deleting user accounts is performed based on how recently an account was used. Thus for example, deleting user accounts may include favoring deleting user accounts that were more recently used as compared to user accounts that were less recently used. This may be done under the assumption that an older account will be used sooner than a newer account. This may be particularly true when users typically use their accounts at a similar time each day. Thus for example, consider a classroom scenario where users rotate through the computing device 102 at different classroom periods throughout the day. A user who has used the computing device more recently is less likely to login sooner than a user who has used the device less recently. Thus, it may be more efficient to delete user accounts for users who have logged in more recently as compared to user accounts for users who have logged in less recently.

Alternatively, deleting user accounts may include deleting user accounts that were less recently used as compared to user accounts that were more recently used. For example, this may be true when some users use the computing device 102 more consistently than other users. Thus, for example, a user having logged into the computing device 102 may serve as an indicator that the user is likely to log in to the computing device 102 again in a shorter time frame than some other users.

The method 300 may be practiced where deleting user accounts is prioritized based on the size of the user accounts or number of elements in a user account. This may be done to recapture resources but still minimize the number of user accounts that are deleted. By deleting larger accounts that take up more space on the disk 108, less user accounts will need to be deleted from the computing device 102 to reach the target disk usage on the computing device 102.

The method 300 may be practiced where deleting user accounts is prioritized based on the amount of offline storage for accounts on the shared computing system. For example, as illustrated in FIG. 1, user account information may be backed up to a cloud service 110. When user accounts need to be recreated on the computing device 102, account information can be downloaded from the cloud service 110 to the computing device 102 and stored in the storage disk 108. If a user account is particularly large, it may be undesirable to download large user accounts from the cloud service 110. Thus, it may be preferable to delete user accounts from the computing device 102 that do not require large downloads from the cloud service 110.

The method 300 may be practiced where deleting user accounts is prioritized based on the number or frequency of logins for the user accounts. For example, users that login to the computing device 102 more than other users, or do so more frequently than other users may be preferred over the other users. Thus it may be desirable not to delete accounts for users that login frequently to the computing device 102 so as to not have to recreate the accounts when the users login to the computing device 102.

The method 300 may be practiced where deleting user accounts takes into account exemptions for one or more user accounts. For example, in some embodiments, particular users may be made exempt from account deletion. The deletion process of user accounts will take into account these exemptions when determining what accounts to delete from the computing device 102.

The method 300 may be practiced where deleting user accounts takes into account user account type (e.g., user role) when determining what accounts to delete. For example, in some embodiments, administrators, teachers in a school environment, or other individuals may be prioritized such that user accounts for these individuals are not deleted from the computing device 102 before other users with different roles have their accounts deleted from the computing device 102.

The method 300 may be practiced where networked domain based accounts are preferred over local accounts at the shared computing system such that local accounts are deleted before networked domain based accounts are deleted. Thus for example, an account that is not connected to a network domain may be deleted before accounts that are connected to the network domains. Additionally, in some embodiments, different domains may be higher priority than other domains. Higher priority domains will only be deleted after user accounts from lower priority domains are deleted.

The method 300 may be practiced where deleting user accounts takes into account the likelihood of users to use the shared computing system. In particular, embodiments may use external data that indicates how decisions should be made with respect to deleting user accounts from the computing device 102. For example, some embodiments may implement time based deletion. If it is known that a user uses the computing device 102 at a particular time, and the current time is at or near the particular time, that user account may be prioritized such that it is not deleted before other user accounts. Alternatively or additionally as illustrated above, frequency of use may indicate whether or not the user is about to use the computing device 102. Alternatively or additionally, knowing work hours for a work environment or class hours for a classroom environment may be indicative of when a user is about to use a computing device 102. Users may be prioritized or de-emphasized based on this information.

The method 300 may further include identifying a critical trigger and as a result of identifying a critical trigger, deleting user accounts in a short time frame. For example consider the disk consumption scenario. In some embodiments, the critical trigger may be triggered when the disk 108 is used at 75% capacity. This may trigger a more aggressive process of deleting user accounts. For example, user accounts may be deleted immediately or shortly after a user logs off of the computing device 102. Another example of an aggressive trigger critical trigger maybe when a user begins to use large amounts of resources. In such embodiments, the computing device 102 may begin to delete user accounts even though the user continues to be logged onto the computing device 102.

The method 300 may further include identifying a maintenance trigger and as a result, deleting user accounts when the shared computing system is idle within some predetermined criteria of idleness. Thus for example, the maintenance trigger may be triggered when the disk 108 reaches a capacity of 50%. In this example, deletion of user accounts by the account management service 104 is performed at various times when the computing device 102 is substantially idle so as to not affect the user experience.

The method 300 may further include deleting portions of a user accounts and identifying those portions as online-only portions of the user account while continuing to maintain other portions of the user accounts at the shared computing device 102. Thus for example, in some embodiments only portions of the user accounts 106 are deleted while other portions of the user accounts 106 are maintained at the computing device 102. The portions of the user accounts 106 that are deleted may be marked as being able to be obtained from the cloud service 110.

The method 300 may further include providing metrics identifying how different account deletion methods affect the ability of users to log on to the shared computing system without experiencing a cache a miss for their particular user account. Thus for example, the account manager service 104 may track how different account deletion decisions are made and determine what effect this has on users logging into the computing device 102. For example, it may be deleterious to users who log into the computing device 102 if their user account is not cached at the computing device 102. Thus, the account manager service 104 may be able to track and report overall user experiences based on a particular method of deleting user accounts.

The method 300 may further include receiving user input configuring the resource trigger. Thus for example, the account manager service 104 may have functionality that allows it to be configured by a user which can affect triggers used, account deletion methods used, and other information.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable storage media having stored thereon instructions that are executable by the one or more processors to configure the computer system to manage different user accounts having different priorities on a shared computing device, having a plurality of different user accounts for a plurality of different users, to maintain at least one of system resources or performance, including instructions that are executable to configure the computer system to perform at least the following:
      identify one or more triggers, wherein at least one of the triggers is a free disk space trigger indicating that one or more user accounts should be deleted from the shared computing device to comply with a predetermined resource target, wherein the resource target comprises an amount of free disk space;
      as a result of the one or more triggers, delete user accounts on the shared computing device to attempt to comply with the predetermined resource target, wherein deleting user accounts is performed based on networked domain connectivity such that local user accounts are deleted prior to networked domain based user accounts, and where user accounts from lower priority networked domains than other user accounts are deleted prior to deleting the other user accounts from higher priority networked domains, such that networked domain based user accounts that are not deleted on the shared computing device have a faster logon time than networked domain based user accounts that are deleted on the shared computing device;
      once the resource target has been reached, cease deleting user accounts as a result.

2. The computer system of claim 1, wherein the one or more triggers comprise resource triggers based on disk usage.

3. The computer system of claim 1, wherein the one or more triggers further comprise resource triggers based on a number of accounts on the shared computing device.

4. The computer system of claim 1, wherein deleting user accounts takes into account exemptions for one or more user accounts.

5. The computer system of claim 1, wherein the deleting user accounts is further prioritized based on the size of the user accounts.

6. The computer system of claim 1, wherein deleting user accounts is further prioritized based on an amount of offline storage for accounts on the shared computing device.

7. The computer system of claim 1, wherein deleting user accounts is further prioritized based on the number or frequency of logins for the user accounts.

8. The computer system of claim 1, wherein deleting user accounts is based on a likelihood that certain users using the shared computing device will login to the computing device within a shorter timeframe than other users.

9. The computer system of claim 1, further comprising deleting portions of a user account and identifying those portions as online only portions of the user account while continuing to maintain other portions of the user account at the shared computing device.

10. A computer implemented method of managing user accounts on a shared computing device to maintain at least one of system resources or performance, the method comprising:
  identifying one or more triggers, wherein at least one of the triggers is a free disk space trigger indicating that one or more user accounts should be deleted from the shared computing device, having a plurality of different user accounts for a plurality of different users, to comply with a predetermined resource target, wherein the resource target comprises an amount of free disk space;
  as a result of the one or more triggers, deleting user accounts on the shared computing device to attempt to comply with the predetermined resource target, wherein deleting user accounts is performed based on networked domain connectivity such that local user accounts are deleted prior to user accounts connected to a networked domain, and where user accounts from lower priority networked domains than other user accounts are deleted prior to deleting the other user accounts from higher priority networked domains, such that networked domain based user accounts that are not deleted on the shared computing device have a faster logon time than networked domain based user accounts that are deleted on the shared computing device; and
  once the resource target has been reached, cease deleting user accounts as a result.

11. The method of claim 10, wherein the one or more triggers further comprise resource based triggers based on queue size.

12. The method of claim 10, wherein deleting user accounts is further prioritized based on an amount of offline storage for accounts on the shared computing device.

13. The method of claim 10, wherein deleting user accounts is further prioritized based on the number or frequency of logins for the user accounts.

14. The method of claim 10, wherein deleting user accounts is based on a likelihood that certain users using the shared computing device will login to the computing device within a shorter timeframe than other users.

15. The method of claim 10, further comprising identifying a critical trigger and as a result of identifying a critical trigger, deleting user accounts in a short time frame.

16. The method of claim 10, further comprising identifying a maintenance trigger and as a result of identifying a maintenance trigger, deleting user accounts when the shared computing device is idle within some predetermined criteria of idleness.

17. The method of claim 10, further comprising, deleting portions of a user account and identifying those portions as online only portions of the user account while continuing to maintain other portions of the user account at the shared computing device.

18. A shared computing device comprising:
  one or more processors;
  one or more computer-readable storage media;
  a plurality of user accounts stored on the one or more computer readable storage media;
  a system state trigger service, implemented using the one or more processors and the one or more computer readable storage media, configured to manage one or more triggers, wherein at least one of the triggers is a free disk space trigger configured to identify when one or more user accounts should be deleted from the shared computing device, having a plurality of different user accounts for a plurality of different users, to comply with a predetermined resource target; and
  one or more policy engines, implemented using the one or more processors and the one or more computer readable storage media, that are configured to evaluate triggers, and as a result of evaluating the one or more triggers, delete user accounts on the shared computing device to attempt to comply with the predetermined resource target, wherein deleting user accounts is performed based on networked domain connectivity such that local user accounts are deleted prior to user accounts connected to a networked domain, and where user accounts from lower priority networked domains than other user accounts are deleted prior to deleting the other user accounts from higher priority networked domains, such that user accounts that are not deleted on the shared computing device have a faster logon time than user accounts that are deleted on the shared computing device.

19. The shared computing device of claim 18, wherein the one or more triggers comprise resource triggers based on disk usage.

20. The shared computing device of claim 18, wherein the one or more triggers further comprise resource triggers based on a number of accounts on the shared computing device.

* * * * *